United States Patent
Zhang et al.

(10) Patent No.: US 12,392,324 B2
(45) Date of Patent: Aug. 19, 2025

(54) METHOD AND DEVICE FOR DETERMINING AN EFFICIENCY AND/OR FOR CALIBRATING A TORQUE OF A ROTATING DRIVE TRAIN, IN PARTICULAR OF A WIND ENERGY INSTALLATION

(71) Applicant: Fraunhofer-Gesellschaft zur Förderung der angewandten Forschung e.V., Munich (DE)

(72) Inventors: Hongkun Zhang, Bremerhaven (DE); Andreas Ruhle, Bremerhaven (DE); Paul Feja, Bremerhaven (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 213 days.

(21) Appl. No.: 18/043,835

(22) PCT Filed: Aug. 27, 2021

(86) PCT No.: PCT/EP2021/073808
§ 371 (c)(1),
(2) Date: Mar. 2, 2023

(87) PCT Pub. No.: WO2022/049008
PCT Pub. Date: Mar. 10, 2022

(65) Prior Publication Data
US 2023/0332577 A1 Oct. 19, 2023

(30) Foreign Application Priority Data
Sep. 3, 2020 (DE) .............. 10 2020 211 141.3

(51) Int. Cl.
*F03D 17/00* (2016.01)
*F03D 15/00* (2016.01)

(52) U.S. Cl.
CPC .............. *F03D 17/00* (2016.05); *F03D 15/00* (2016.05); *F05B 2270/20* (2013.01); *F05B 2270/335* (2013.01)

(58) Field of Classification Search
CPC ....... F03D 17/00; F03D 15/00; F05B 2270/20; F05B 2270/335; G01L 3/242
See application file for complete search history.

(56) References Cited

U.S. PATENT DOCUMENTS 1,662,705 A    3/1928   Highfield

FOREIGN PATENT DOCUMENTS

| CN | 206876320 U | 1/2018 |
| CN | 207396040 U | 5/2018 |

(Continued)

OTHER PUBLICATIONS

English Translation, DE 10 2018 203 525 (Year: 2019).*

(Continued)

*Primary Examiner* — Courtney D Heinle
*Assistant Examiner* — John S Hunter, Jr.
(74) *Attorney, Agent, or Firm* — Schwegman Lundberg & Woessner, P.A.

(57) ABSTRACT

A method and device for ascertaining drive train efficiency includes performing first and second tests on a drive train having first and second shaft portions driven by respective drive devices and connected by a mechanical transfer element. The method includes detecting torque-dependent variables at both shaft portions during each test while driving one end and measuring corresponding variables at the opposite end. The drive train efficiency is determined based on one or more of: a power determined during the first and the second test, a variable dependent on the torque acting on the (Continued)

first shaft portion and on the second shaft portion during the first and second test, and at least one predetermined criterion.

23 Claims, 10 Drawing Sheets

(56) References Cited

FOREIGN PATENT DOCUMENTS

| | | |
|---|---|---|
| DE | 19829178 A1 | 1/2000 |
| DE | 10326212 A1 | 3/2005 |
| DE | 102010047413 A1 | 6/2011 |
| DE | 102010033308 A1 | 2/2012 |
| DE | 102010049407 A1 | 3/2012 |
| DE | 102018203525 | 7/2019 |
| WO | WO-2019170539 A1 | 9/2019 |

OTHER PUBLICATIONS

"International Application Serial No. PCT/EP2021/073808, International Search Report dated Dec. 7, 2021", w/ English Translation, (Dec. 7, 2021), 4 pgs.

"German Application Serial No. 10 2020 211 141.3, Office Action dated Jun. 7, 2021", (Jun. 7, 2021), 7 pgs.

"European Application No. 21 770 177.0, Office Action dated Apr. 5, 2024", (Apr. 5, 2024), 11 pgs.

* cited by examiner

METHOD AND DEVICE FOR
DETERMINING AN EFFICIENCY AND/OR
FOR CALIBRATING A TORQUE OF A
ROTATING DRIVE TRAIN, IN PARTICULAR
OF A WIND ENERGY INSTALLATION

PRIORITY APPLICATIONS

This application is a U.S. National Stage Filing under 35 U.S.C. § 371 from International Application No. PCT/EP2021/073808, filed on Aug. 27, 2021, and published as WO2022/049008 on Mar. 10, 2022, which claims the benefit of priority to German Application No. 10 2020 211 141.3, filed on Sep. 3, 2020; the benefit of priority of each of which is hereby claimed herein, and which applications and publication are hereby incorporated herein by reference in their entireties.

TECHNICAL FIELD

The present application relates to a method for ascertaining an efficiency and/or for calibrating a torque of a rotating drive train, in particular of a drive train or of part of a drive train of a wind turbine. The method for ascertaining an efficiency and/or for calibrating a torque of a drive train, in particular of a drive train of a wind turbine, is suitable in particular to be carried out on a test bench and comprises two tests. The drive train has a first end with a first shaft portion and a second end with a second shaft portion, between which there is arranged a mechanical transmission element, in particular a gear unit. In a first test a first end of the drive train is driven. In a second test a second end of the drive train is driven; an efficiency and/or calibration parameter is determined from the measurement variables detected in the first test and in the second test.

Such a method is already known in principle from German patent DE 10 2018 203 525 B3.

The present application relates accordingly to a method for ascertaining an efficiency and/or for calibrating a torque of a drive train or of part of a drive train, in particular of a drive train of a wind turbine, in particular on a test bench.

BACKGROUND

The known prior art in this regard can be summarized as follows:

DE 10 2010 049 407 A1 describes a test bench for a wind turbine and a method for testing the latter, wherein the test bench comprises on the one hand a motor drive and on the other hand a gear unit and a generator. The gear unit is the test bench component to be tested and the motor drive for supplying the gear unit is provided with a torque simulating a wind force.

U.S. Pat. No. 1,662,705 A discloses a device for testing motor vehicle transmission mechanisms which is also usable for other mechanical force transmission mechanisms.

CN 206 876 320 U describes a test bench for testing the efficiency of a gear unit of a vehicle.

DE 10 2010 047 413 A1 and DE 103 26 212 A1 also disclose methods and devices for ascertaining a power loss or an efficiency of a vehicle gear unit or of a test piece transmitting a torque.

German patent DE 10 2018 203 525 B3, mentioned at the outset, already describes a method for ascertaining an efficiency and/or for calibrating a torque of a rotating drive train, in which electrical powers are measured from drive and/or output units.

SUMMARY

For manufacturers and operators of wind turbines, the efficiency and the torque of a drive train of a wind turbine are both important characteristic values for development and also indicators for the technical maturity of a wind turbine. For this reason, there is a need for a sufficiently accurate efficiency measurement in different load situations and different ambient conditions, in particular at high torques. The most accurate efficiency determination possible at high torques thus allows greater knowledge of the wind turbine. This knowledge of the efficiency characteristic curve is the basis for a targeted further development and optimized operation of a wind turbine.

The accuracy of efficiency measurements according to the prior art is dependent here, amongst other things, on the accuracy of a torque measurement at the drive train of the wind turbine. In modern wind turbines, a torque of the main shaft of the drive train is often several meganewton meters (MNm). Calibration devices from the prior art, however, allow a calibration only up to a torque of 1.1 MNm. Since there are not currently any calibration options for higher torques, a sufficiently accurate measurement of the mechanical torque at the main shaft of a wind turbine is not possible with the known method.

For this reason, amongst other things, it is also already known to determine the efficiency of WT gear units by so-called back-to-back tests, in which two gear units are coupled to one another on the slowly rotating shaft. Precise torque sensors are installed on the quickly rotating shaft, where the torque is much lower, in order to perform the torque measurement there. The input and output powers are determined by torque and rotary speed measurements—the efficiency of the assembly comprising two gear units is thus determined and can be divided across the individual gear units. A significant disadvantage of this method lies in the fact that the general conditions in the test do not correspond to the situation in the WT drive train. In particular, the parasitic loads, which have a strong presence in a WT, are not applied in the test, or are very difficult to apply to both gear units uniformly.

The object of the present invention, against the background of the prior art, is to propose a method and a device with which an efficiency of a wind turbine can be determined as accurately as possible with the use of limited means. A further object of the invention may be to propose the most simple method possible for calibrating a main shaft torque of a wind turbine.

These objects are achieved by a method according to the features of claim 1 and/or claim 2 and by a device according to claim 15.

Advantageous developments can be found with the features in the dependent claims and the exemplary embodiments.

The invention thus relates, amongst other things, to a method for ascertaining an efficiency of a drive train, in particular of a drive train or of part of a drive train of a wind turbine, the drive train having a first end with a first shaft portion driveable by means of a first drive device and a second end with a second shaft portion driveable by means of a second drive device, between which there is arranged a mechanical transmission element, in particular a gear unit. It is provided here, to achieve the object, that the first end of the drive train is driven in a first test and a variable dependent on the torque acting on the first shaft portion is detected at the first end of the drive train and a variable dependent on the torque acting on the second shaft portion is detected at the second end of the drive train, and that the second end of the drive train is driven in a second test and the variable dependent on the torque acting on the second shaft portion is detected at the second end of the drive train and a variable dependent on the torque acting on the first shaft portion is detected at the first end of the drive train, and that an efficiency is ascertained from the powers determined in the first test and in the second test and/or from the variables dependent on the torques, under consideration of at least one assumption predetermined on the basis of experiments or experience.

The invention thus further relates also to a method for calibrating a torque measurement of a drive train or of part of a drive train, in particular a drive train of a wind turbine, on a test bench, the drive train having a first end with a first shaft portion driveable by means of a first drive device and a second end with a second shaft portion driveable by means of a second drive device, between which there is arranged a mechanical transmission element, in particular a gear unit. To solve the problem it is provided here that the first end of the drive train is driven in a first test and a variable dependent on the torque acting on the first shaft portion is detected at the first end of the drive train and a variable dependent on the torque acting on the second shaft portion is detected at the second end of the drive train, and that the second end of the drive train is driven in a second test and the variable dependent on the torque acting on the second shaft portion is detected at the second end of the drive train and a variable dependent on the torque acting on the first shaft portion is detected at the first end of the drive train and calibration parameters a and b are ascertained from the powers ascertained in the first test and in the second test, under consideration of at least one assumption predetermined on the basis of experiments or experience, the first and the second test being performed for at least two different torque stages.

The drive units in the described method can each be realized here for example by electric motors which can work at least in part also in generator operation.

The method for ascertaining an efficiency and/or for calibrating a torque of a drive train is suitable in particular to be carried out on a test bench and comprises two tests. The drive train has a first end at a shaft portion connectable to a motor, and a second end, a gear unit for example being arranged between the ends. The motor is preferably a motor of the test bench. The first shaft portion can be, in particular, a wind turbine main shaft connectable to a rotor of a wind turbine. Both drive units of the structure can be formed as rotating electric machines, which allow both a motor operation and a generator operation.

In a first test the first end of the drive train is driven for example by means of the first drive unit. Here, a variable dependent on the torque at the first shaft portion is determined at the first end of the drive train and a variable dependent on the torque at the second shaft portion is determined at the second end of the drive train. The second drive unit at the second end of the drive train can be operated in this case as a generator.

In a second test the second end of the drive train, for example the generator-side end in the case of a wind turbine, is driven for example by means of the second drive unit and the variable dependent on the torque acting on the second end or the second shaft portion is determined at the second end, and the variable dependent on the torque acting on the first shaft portion is determined at the first shaft portion or at the first end of the drive train. The first drive unit at the first end of the drive train can be operated in this case as a generator, and the second drive unit can be formed by the generator of the wind turbine.

An efficiency is ascertained from the torques determined in the first test and in the second test or from the variables dependent on the torques, in particular with use of at least one assumption which is defined beforehand in previous experiments and analyses. An assumption can consist for example in the fact that the efficiency of the first test is the same as the efficiency of the second test. Another assumption can be made to the effect that a power loss of the first test is a specific fraction of the overall power loss of both tests, for example half.

To ascertain the powers in the first and second test (test A and test B), rotary speeds or rotational speeds or time-resolved angular positions can additionally be measured at one or both ends of the drive train or at a position of the drive train, in addition to the variables dependent on the respective torque. During the current measurement of angular positions of a shaft portion, the torque can be integrated over time, even with varying rotary speeds, in order to perform the measurement in dynamic situations.

In the proposed method, in the first test a first torque is applied from the first end of the drive train and in the second test a second torque is applied from its second end. The torques can have the same sign in both tests, and the rotation of the drive train can have an opposite rotary direction in each case. This may have the advantage that, in the efficiency determination, a measurement uncertainty of the variable dependent on the main shaft torque is reduced, since the measurement uncertainties of the first and second test can be subtracted.

The torques acting on the first and the second end or on the first and second shaft portion can, however, also be directed oppositely in the first and second test, and the drive train or the first and second shaft portion or the first and second end of the drive train in the first and second test have in each case the same rotary direction, with the result that the direction of the torques differs between the first and second test. In particular when calibrating the torque measurement, the torque measurement range can thus be significantly increased on the whole due to the different sign of the applied torques in both tests, and thus the calibration can be improved.

Since the drive in the first and second test is provided from different ends of the drive train, specifically in the first test at the first end, and in the second test at the second end, that is to say the drive train can be driven for example by means of a motor at the first end and by means of the generator at the second end of the drive train, a transmission direction of the transmitted power and energy between the first and the second test is reversed.

To ascertain the acting torques, the variable dependent on the torque acting on a shaft portion or an end of the drive train can be measured by means of a sensor, preferably using a strain gauge or for example a piezo sensor or an optical, strain-sensitive sensor. In any case, the torque can be measured directly at each end of the drive train by a sensor on an element transmitting a torque, said sensor detecting a mechanical measurement variable. Furthermore, an angular position of a shaft portion and/or a rotary speed can be measured, in particular using an incremental encoder. A torque and a power can thus be determined in a simple way. A measurement point for measuring the torque, or the torque-dependent variable, is preferably located as close as possible to a measurement point for measuring the angular position or the rotary speed. In this way, it is possible that between the measurement points there are only minimal vibrations, which may falsify the measurement results.

It can be provided in the described method that it is assumed for determining the efficiency or for calibrating a torque measurement that the efficiency of the first test is equal to the efficiency of the second test.

A possible realization of the invention can also provide, as mentioned above, that an assumption for determining the efficiency and/or for calibrating a torque measurement is the assumption that a power loss of one of the two tests is a specific fraction of the overall power loss of the two tests.

It can additionally be provided that, to ascertain the torque of a shaft portion, the variable dependent on the torque acting on this shaft portion is measured by means of a sensor, preferably using a strain gage, and/or in that an angular position $\Theta$ of the shaft portion or its rotary speed w is measured, preferably using an incremental encoder.

Additionally, it can be provided that a mechanical power for the first and for the second test is ascertained, respectively, from the variables dependent on the torques acting on the first and second shaft portion.

One form of implementation of the invention can additionally provide that in the first and/or second test on the drive side and/or the output side, in each case an electrical power of a drive unit operated as a motor or generator is measured, at least one voltage and at least one current being measured in particular to determine the electrical power at one of the drives.

By way of such a measurement, the mechanical measurements can be supplemented or calibrated or, conversely, electrical measurements can be supplemented by additional mechanical measurements, in order to achieve a greater accuracy or a higher reliability of the measurement.

It can additionally be provided that for the first test and for the second test a test power loss is ascertained, these two ascertained test power losses are added to give an overall power loss and the efficiency is calculated with use of the overall power loss.

In addition, it can be provided in the described method that to determine the variable dependent on the torque acting on the first or second shaft portion, the measurement signal of a sensor is evaluated, the sensor being arranged on the particular shaft portion or on a shaft adapter being the particular shaft portion and an adjacent shaft portion.

It can additionally be provided that during the first test the drive train is operated at different working points and during the second test the drive train is operated at different working points, the operated working points in the first and second test preferably being the same.

The different working points differ typically by different torque or power levels during the different measurements.

A further possible implementation of the invention can provide that in the second test the second end of the drive train is driven in such a way that the variable dependent on the torque acting on the first shaft portion in the second test is the same as the variable dependent on the torque acting on the first shaft portion determined in the first test.

Particularly favorable conditions are thus provided for the evaluation, under which systematic measurement errors can be neutralized particularly well.

It can also be provided that in the second test the second end of the drive train is driven in such a way that the variable dependent on the torque acting on the second shaft portion in the second test is the same as the variable dependent on the torque acting on the second shaft portion determined in the first test.

Particularly favorable conditions are thus provided, in this set-up too, for the evaluation, under which systematic measurement errors can be neutralized particularly well.

In addition it can be provided that the rotary direction of the first and second shaft portion during the first and second test is the same.

Different directions of the torques are thus provided for the first and second test, as already mentioned above.

It can also be provided that a mechanical power $P_{mech.left.A}$ and $P_{mech.left.B}$ is determined with use of the variable dependent on the torque acting on the first shaft portion and a mechanical power $P_{mech.right.A}$ and $P_{mech.right.B}$ is determined with use of the variable dependent on the torque acting on the second shaft portion depending on two constants a and b for the first test and for the second test for both sides in each case and on the basis of $P_{mech.left.A}-P_{mech.right.A}=k(P_{mech.right.B}-P_{mech.left.B})$ and $P_{mech.left.A}+kP_{mech.left.B}=kP_{mech.right.B}+P_{mech.right.A}$, k being a ratio between the losses (in the form of a transmitted energy as integral, given in each case by the average power loss, divided by the test time) of the first test $$P^{int}_{mechA}=\text{integral}(a*\varepsilon+b)d\Theta/t_A$$

and of the second test $$P^{int}_{mechB}=\text{integral}(a*\varepsilon+b)d\Theta/t_B,$$

the calibration parameters a and b being ascertained to determine a torque $T=a*\varepsilon+b$, T being the torque and $\varepsilon$ being the measured variable dependent on the torque acting on the first shaft portion.

The invention can thus be implemented in that each of the torque stages corresponds to a different power stage of the drive train. An equation system can thus be solved at least approximately, in order to determine a and b.

It can also be provided that, proceeding from a predefined efficiency, the calibration parameters can be determined, then efficiencies for at least two power stages can be ascertained, and then the calibration parameters are determined again, and the last two steps are repeated until the deviation between the last and the previous determination is smaller than a predetermined value.

Lastly, it can also be provided that the calibration parameters are determined using the method of least squares.

Lastly, the invention also relates to a device for ascertaining an efficiency of a drive train, in particular of a drive train or of part of a drive train of a wind turbine or for calibrating a torque measurement, comprising a first drive device for driving a first end of the drive train, and comprising a second drive device for driving a second end of the drive train, and also comprising a first measuring device for detecting at the first end of the drive train a variable dependent on the torque acting on the first end of the drive train, and comprising a second measuring device for detecting at the second end of the drive train a variable dependent on the torque acting on the second end of the drive train, and comprising at least one third measuring device for detecting a rotary speed or a rotary angle of the drive train. The drive devices can be realized as rotating electric machines with motor and generator function. Additional loading elements for generating braking torques can also be provided. The device can also comprise a control device for controlling the measurement, including the controller of the drive units and an evaluation device for detecting and evaluating the measurement values.

The invention will be shown in figures of a drawing and explained hereinafter on the basis of exemplary embodiments.

BRIEF DESCRIPTION OF THE FIGURES

In the drawings:

FIG. 15). The rotary direction remains unchanged as compared with test A from FIG. 15.

DETAILED DESCRIPTION

Figure 1:
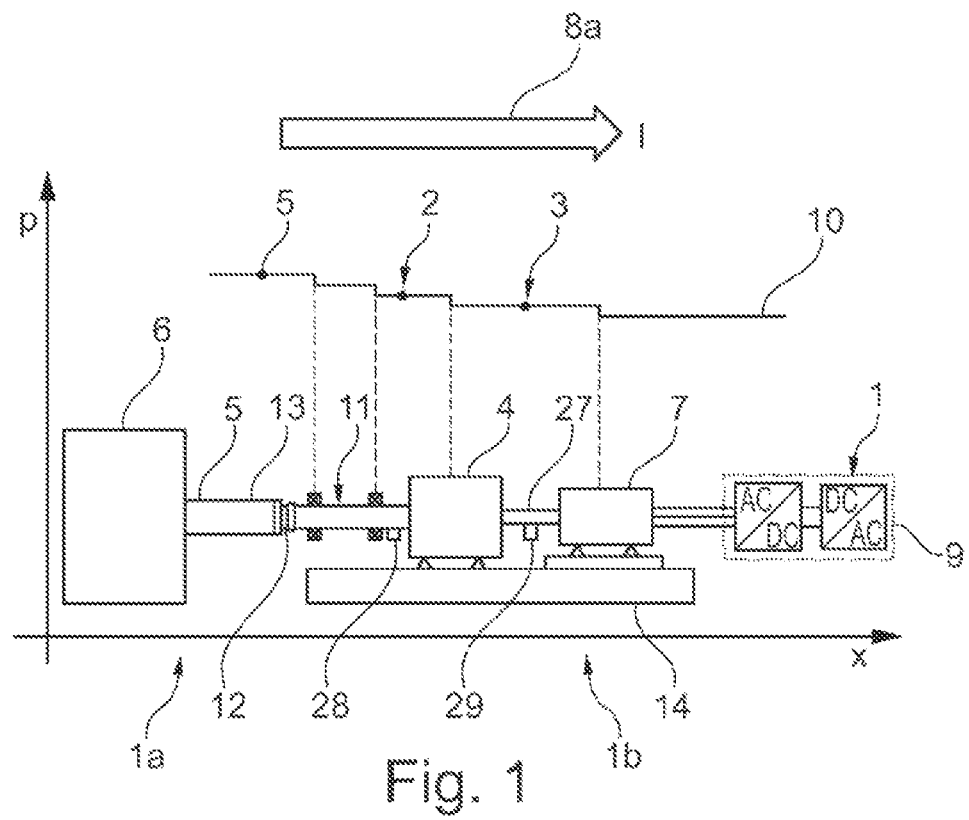
FIG. 1 shows in a graph the course of the energy conversion in normal operation.

Hereinafter, a gear unit 4 serves as an example for a sub-component of the drive train 1. Before and after the gear unit 4/the component, torque measurements are performed with the aid of torque sensors 28, 29 (FIG. 1 and FIG. 2, points 2 and 3 to the left and right of the gear unit 4). Neither measurement has to be highly accurate. In addition, the rotary speed is measuring using a rotary speed sensor 30, for example at measurement point 2, 3 or 5. The drive train can be tested for example on a nacelle test bench.

In a first test run/test, as shown in FIG. 1, the drive train 1 is driven at its first end 1$a$ by a drive unit in the form of the motor 6 of the test bench and the second drive unit 7 at the second end 1$b$ of the drive train is operated in its normal generator mode. The direction of the force flow or energy/power flow is denoted by the arrow 8$a$ from left to right; a rectifier connected to the generator is denoted by 9. The line 10 denotes, at the respective points along the drive train, the level of the locally acting torque and/or the transmitted power. A schematically illustrated portion of the drive train 1 that forms the main shaft of the wind turbine is denoted by 11. A shaft adapter is denoted by 12, and a drive shaft of the test bench is denoted by 13. A machine support is denoted by 14, on which the components of the test bench and also the test piece can be mounted. A path x along the drive train is plotted on the horizontal axis of the graph, whereas the torques measured along the drive train at the respective points (or variables clearly dependent on said torques), or proportionally thereto the locally transmitted power P, are plotted on the vertical axis.

Functionally like parts are denoted in all of the following figures by the same reference signs.

Figure 2:
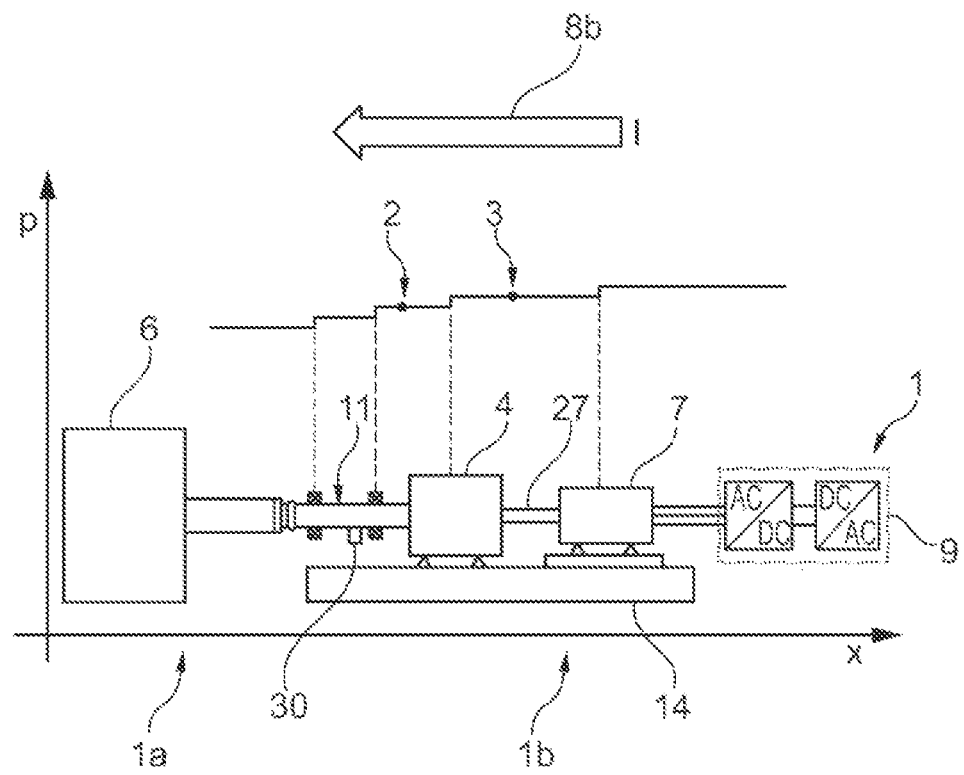
FIG. 2 shows in a further graph the course of the energy conversion in reverse operation (the generator of the wind turbine runs in motor operation and the motor of the test bench in generator operation).

In a second test run/test, as shown in FIG. 2, the drive train 1 drives, from its second end 1$b$, the motor of the test bench; the generator 7/the second drive unit of the drive train 1 thus runs in motor operating mode. Here, the drive train rotates during the second test run in the opposite rotary direction as compared to the first test run. The rotary speed should correspond here at all points of the drive train to that of the first test run. The direction of the force flow from right to left is shown by the arrow 8$b$.

Figure 4:
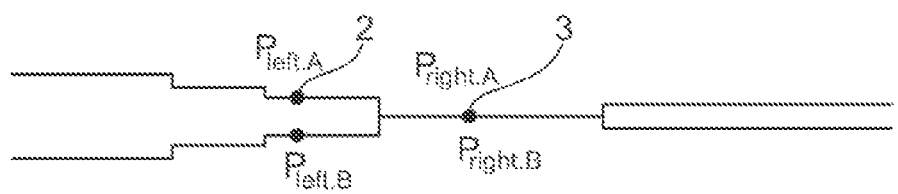
FIG. 4 shows schematically a test scenario in which the mechanical power on the right/second side of the gear unit is kept approximately constant during the first and second test. The uncertainty of the efficiency determination can thus be reduced.
Figure 5:
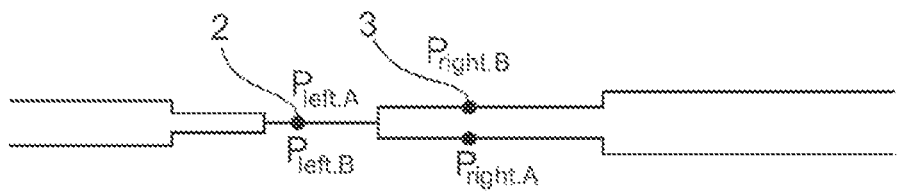
FIG. 5 shows a test scenario in which the mechanical power on the left side/at the first end of the drive train with a gear unit is kept approximately constant during both tests. The uncertainty of the efficiency determination can thus be reduced.

The measured mechanical powers of the two test runs either on the left side/at the point 2 of the drive train as shown in FIG. 5 or on the right side of the gear unit/at the second end 1$b$/second shaft portion of the drive train 1, as shown in FIG. 4 and denoted by the point 3 should preferably be of the same value. The drive torques or powers of the drive units 6, 7 are controlled suitably for this purpose. In addition, other states of the gear unit, for example the temperature, states of the lubrication and cooling systems, should also be kept constant in both tests to the greatest possible extent.

Figure 3:
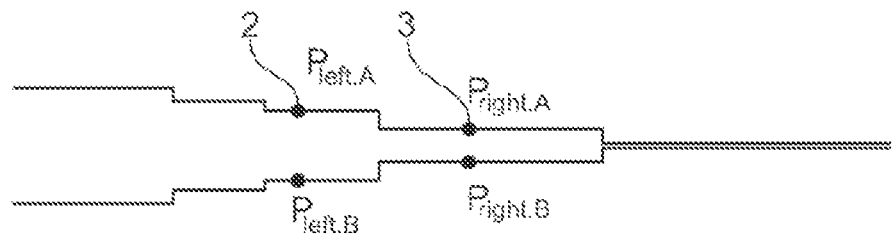
FIG. 3 shows a graph for a test scenario in which the mechanical power at neither of the two ends of the drive train is kept constant during both tests. A relatively large uncertainty of the efficiency determination thus results.

The two described tests will be referred to hereinafter as test A (first test) and test B (second test). In FIG. 3, the transmitted power for both tests is shown for comparison in a graph for the case that the power and the torque are not kept at the same level for both tests at either of the two ends of the drive train.

The power loss of the gear unit in each individual test is determined as follows:

$$P_{Loss.A} = P_{left.A} - P_{right.A}$$

$$P_{Loss.B} = P_{right.B} - P_{left.B}$$

The overall power loss in both tests:

$$P_{Loss,total} = P_{left.A} - P_{left.B} + P_{right.B} - P_{right.A}$$

$$P_{left} = T_{left} \cdot \omega \quad P_{right} = T_{right} \cdot \omega$$

Assumption:

$$P_{Loss.A} = k \cdot P_{Loss.B}$$

The efficiency of an individual test is determined as follows:

$$\eta_A = 1 - \frac{P_{Loss.A}}{P_{left.A}} = 1 - \frac{k}{k+1} \frac{P_{Loss.total}}{P_{left.A}}$$

$$\eta_B = 1 - \frac{P_{Loss.B}}{P_{right.B}} = 1 - \frac{k}{k+1} \frac{P_{Loss.total}}{P_{right.B}}$$

The above-presented method can be combined for example with the method according to DE 10 2018 203 525 B3, that is to say with additional measurements of the electrical power at one or both drive units.

The following example of the uncertainty consideration shows that with the method according to the invention a surprisingly high accuracy is achieved with relatively large measurement uncertainties:

In order to explain the advantage of the method in respect of the measurement accuracy, an example of the uncertainty consideration of the efficiency determination of a gear unit is presented here.

Assumption

1. Measurement errors of the torque measurement, as considered from the driving unit, before and after (left/first end and right/second end) in each case
   a. ±5% in sensitivity
   b. ±0.5%*End value in respect of offset
2. Efficiencies from the gear unit $\eta_A = \eta_B$
   a. 97% in normal mode
   b. 97% in reversed mode
3. Measurement error of the rotary speed insignificant
4. Nominal power 1000 kW, nominal rotary speed 9.55 rpm It is evident that the efficiency cannot be determined reliably on the basis of the uncertainty in the torque measurements.

Derivation in the Case of a Combination Measurement Consisting of Two Tests, as Shown in FIG. 4

P in each of the calculations means the power, T means a torque, and w means an angular velocity or rotary speed. The indices in each case denote the right or left side of the drive train or a component to be measured and the letters A and B denote the first or second test.

1. Measurement error in the overall loss $$P_{Loss,total} = P_{left.A} - P_{left.B} + P_{right.B} - P_{right.A}$$

The measurement errors of the offset of the torque measurement are eliminated since only the delta value is relevant.

The uncertainty of $P_{Loss,total}$ is then ±5%.

2. Measurement errors in the powers $P_{right.A}$, $P_{right.B}$, $P_{left.A}$ and $P_{left.B}$: in each case overall ±6% in relation to measurement values. Da includes the 5% measurement errors in sensitivity and other measurement errors of another type.

Assumption: real value of $P_{left.A}$ is 1000 kW, then $$P_{left.A} = 1000 \text{ kW}$$

$$P_{right.A} = 970 \text{ kW}$$

Assumption that $P_{right.B}$ corresponds exactly to $P_{right.A}$:

$$P_{right.B} = 970 \text{ kW}$$

$$P_{left.B} = 940.9 \text{ kW}$$

$$P_{Loss,total} = 1000 - 940.9 + 970 - 970 = 59.1 \text{ kW}$$

Total efficiencies:

$$\eta_{overal} = \eta_A \cdot \eta_B = 1 - \frac{P_{Loss,total}}{P_{left.A}}.$$

With the assumption of +5% measurement errors of $P_{Loss,total}$ and −6% for $P_{left.A}$, this results in the greatest possible measurement error of $\eta_{overal}$:

$$\eta_{overal} = \eta_A \cdot \eta_B = 1 - \frac{59.1 \times 105\%}{1000 \times 94\%} = 93,398\%$$

Da $\eta_A = \eta_B$,
$\eta_A^2 = 93.3984\%$
$\eta_A = 96.64\%$

An error is given of 96.64%−97%=−0.36%. In comparison to a 5% error in the torque measurement, this is a considerable improvement.

Although some simplifying and optimized assumptions have been included in the calculation, the advantages are still largely maintained in principle, even with deviations.

1. Variant I

Efficiency determination on a test bench for mechanical components, for example a gear unit test bench.

For the case that a gear unit 4 is tested without wind turbine (WT) drive train, the gear unit can be drive on both sides by electric machines 6, 7 of the test bench. The above-described method can also be used.

Since there is only one gear unit during the test, specific Load Application Unit (LAU) systems can be used in order to apply parasitic loads to the gear unit.

Figure 6:
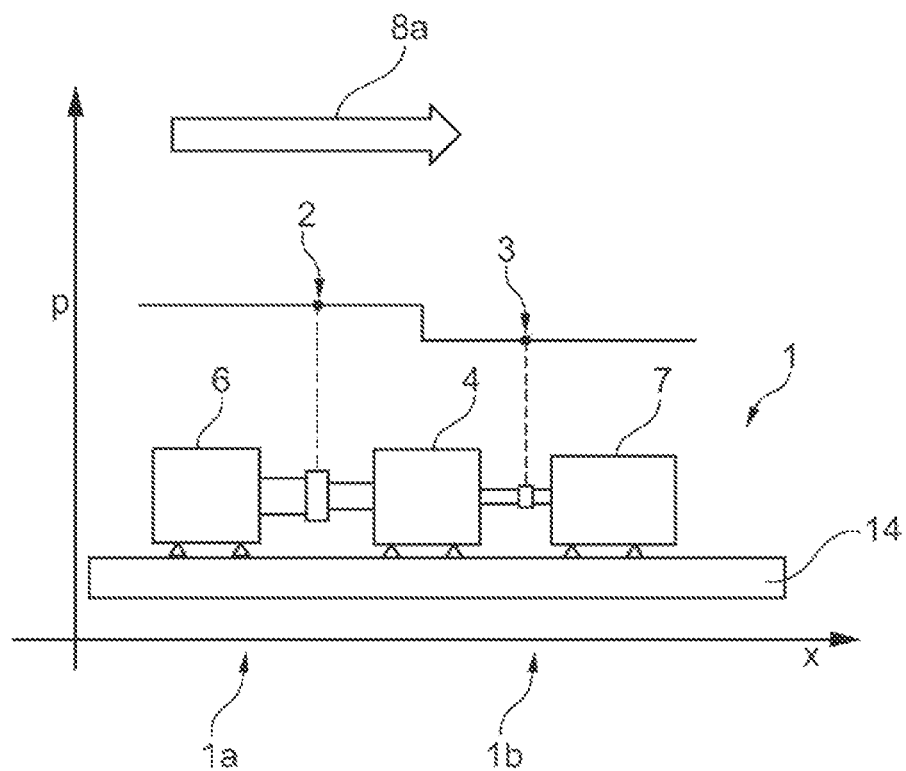
FIG. 6 shows in a graph a test bench for test A, the first test, in which a drive train with gear unit is driven from the left side by motor I, which can be part of the test bench.
Figure 7:
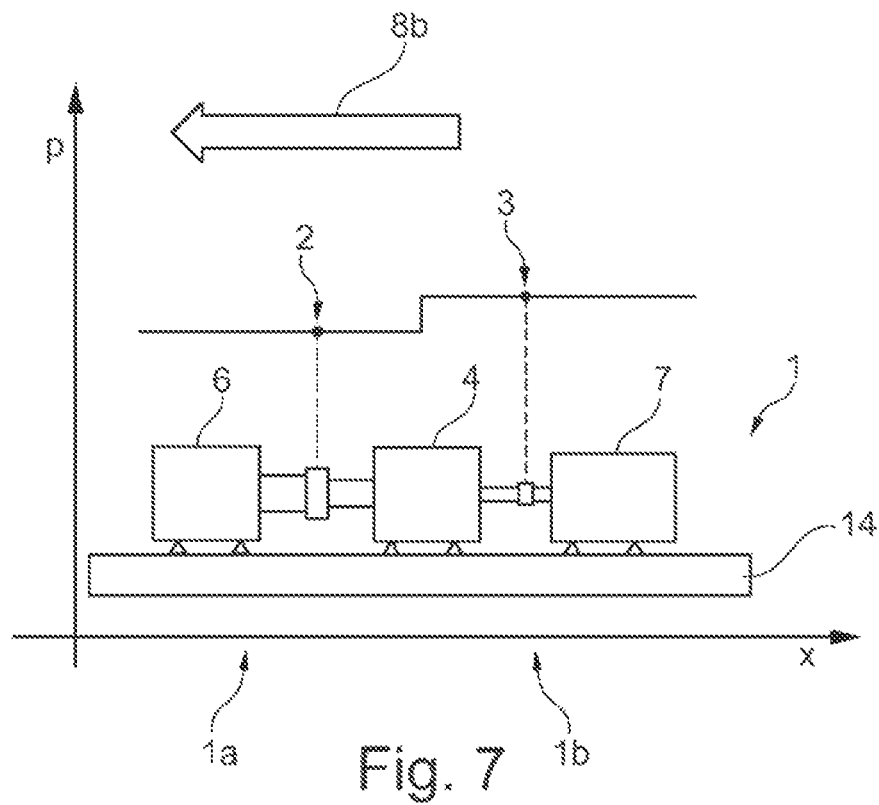
FIG. 7 shows in a further graph test B, the second test, in which a drive train with gear unit in comparison to FIG. 6 is driven from the right side. The rotary direction is reversed in comparison to test A.
Figure 8:
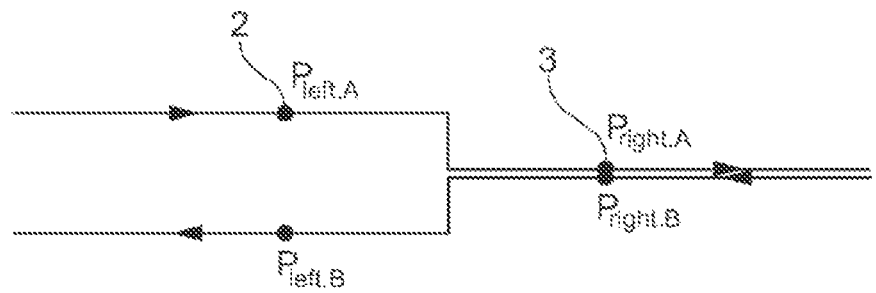
FIG. 8 shows a graph with a test scenario in which the powers on the right side are kept approximately constant for both tests.

The variant is shown in FIGS. 6, 7 and 8 and will be described with reference to these figures.

FIG. 6 shows the set-up for test A. The gear unit is driven from the left side by motor 6. The second drive unit 7 operates in generator mode.

FIG. 7 shows the set-up for test B (second test). The gear unit is driven from the right side by motor 7. Motor 6 operates in generator mode. The rotary direction of all shaft portions of the drive train is reversed in comparison to test A from FIG. 6.

FIG. 8 shows the levels of the transmitted powers and torques at the points 2 (first end/left side of the drive train to be tested) and 3 (second end/right side of the drive train): In the two described tests, the powers on the right side (at point 3) are kept approximately the same.

The powers can be easily determined from the measurements of the torques (measured at the points 2 and 3) and rotary speeds (the location of this measurement is selectable along the drive train, optimized in the vicinity of the torque measurements).

P in each of the calculations means the power, T means a torque, and w means an angular velocity or rotary speed. The indices in each case denote the right or left side of the drive train or a component to be measured and the letters A and B denote the first or second test.

For example:

$$P_{left.A} = T_{left.A} \cdot \omega_A$$

$$P_{right.A} = T_{right.A} \cdot \omega_A$$

The overall power loss:

$$P_{Loss.total} = P_{left.A} - P_{left.B} + P_{right.B} - P_{right.A}$$

Assumption:

$$P_{Loss.A} = k \cdot P_{Loss.B}$$

The efficiency of an individual test is determined as follows:

$$\eta_A = 1 - \frac{P_{Loss.A}}{P_{left.A}} = 1 - \frac{k}{k+1} \frac{P_{Loss.total}}{P_{left.A}}$$

$$\eta_B = 1 - \frac{P_{Loss.B}}{P_{right.B}} = 1 - \frac{k}{k+1} \frac{P_{Loss.total}}{P_{right.B}}$$

2. Variant II

This variant is useful for the case that both tests have to be performed with only the same rotary direction, and therefore the acting torque direction reverses from test 1 to test 2.

In certain cases, the tested drive trains or components can only be run in one specific rotary direction, for example due to the operation of plain bearings or helical toothing in the gear unit.

Figure 9:
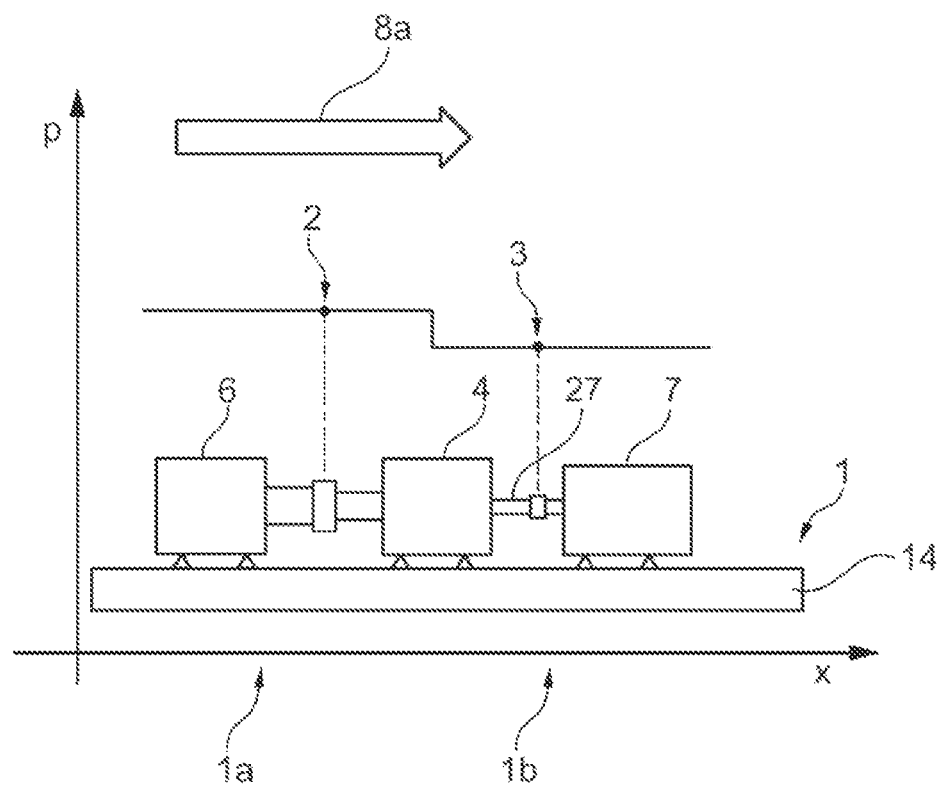
FIG. 9 shows in a graph a further first test A. The gear unit is driven from the left side (as in FIG. 6).
Figure 10:
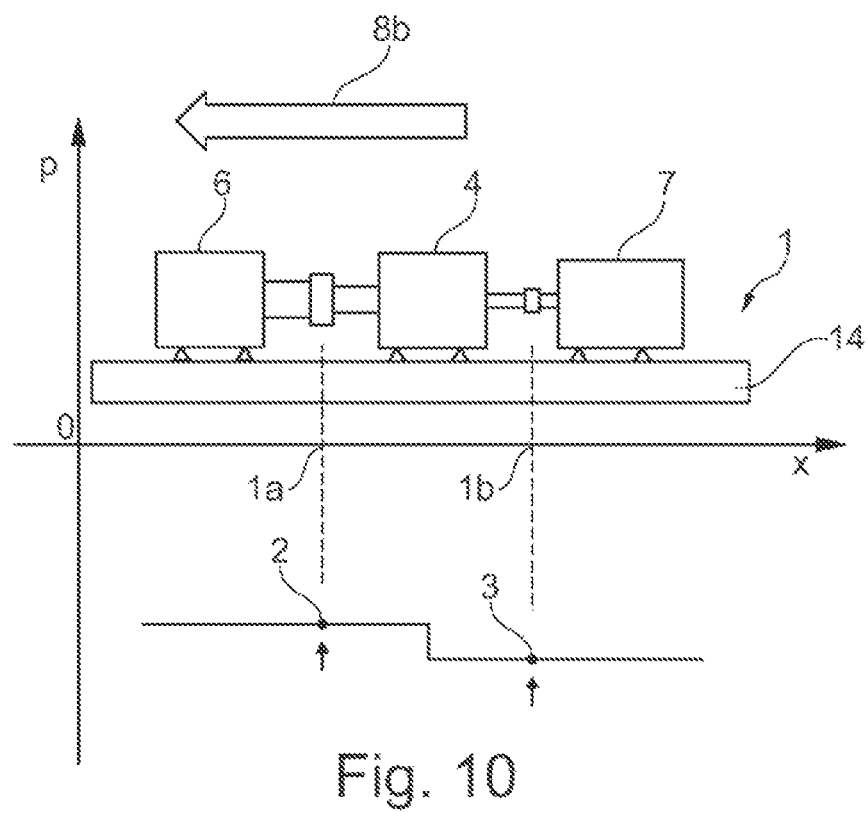
FIG. 10 shows in a further graph a further second test B. The gear unit is driven from the right side. The rotary direction is unchanged in comparison to test A. Due to the unchanged rotary direction, the sign of the torques is the reverse compared to test A.
Figure 11:
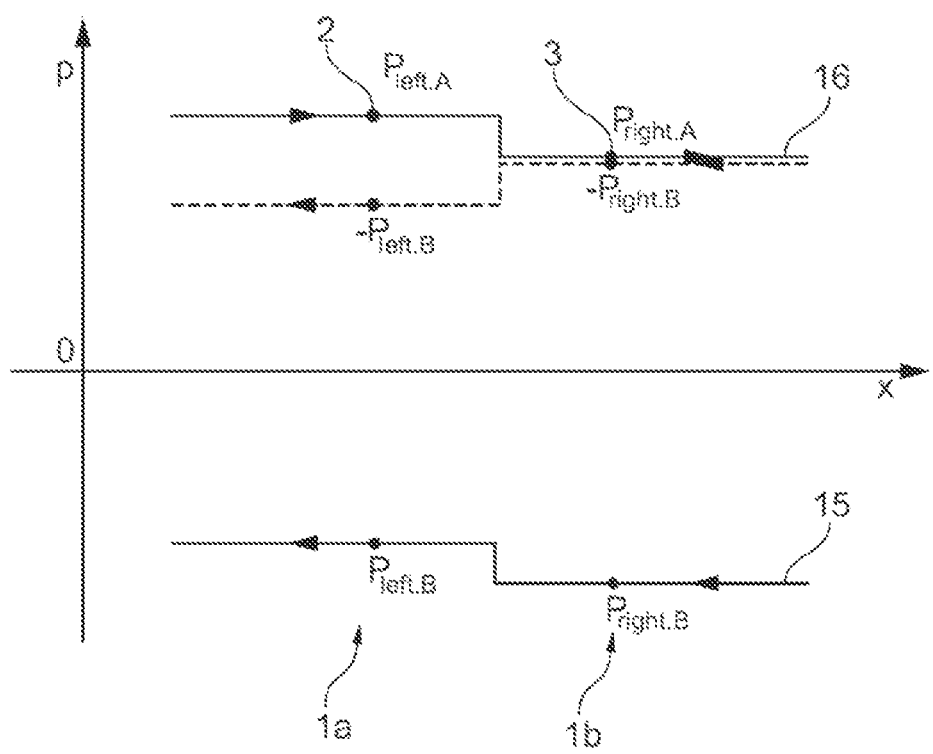
FIG. 11 shows in a further graph the combination of measurement values from the constellations shown in FIGS. 9 and 10. The overall power loss can be determined with a sign change of the powers from test B.

By way of example, a gear unit test bench will be considered with reference to FIGS. 9, 10 and 11.

FIG. 9 shows the set-up for the first test/test A. The gear unit is driven from the left side by motor 6. The electric machine 7 operates in generator mode.

FIG. 10 shows the set-up of the second test/test B. The gear unit 7 is driven from the right side by the electric machine 7 in motor operation. The motor/the electric machine 6 operates in generator mode. The rotary direction is unchanged in test B in comparison to test A. Due to the unchanged rotary direction, the sign of the acting and measured torques changes.

FIG. 11 shows a graph of the powers or torques measured along the drive train at the points 2 and 3 or at the ends 1*a* and 1*b* of the drive train. Curve 16 shows the torques/powers from test 1/test A. With the sign change for the torques and powers measured in test B (curve 15), the overall power loss of both tests can be determined over a large torque range.

The powers can be easily determined with the detection of torque and rotary speed.

For example:

$$P_{left.A} = T_{left.A} \cdot \omega_A$$

$$P_{right.A} = T_{right.A} \cdot \omega_A$$

The overall power loss:

$$P_{Loss.total} = P_{left.A} + P_{left.B} - P_{right.B} - P_{right.A}$$

Note: the power loss is defined as absolute value:

$$P_{Loss.B} = \text{abs}(P_{right.B} - P_{left.B}) = P_{left.B} - P_{right.B}$$

Assumption:

$$P_{Loss.A} = k \cdot P_{Loss.B}$$

The efficiency of an individual test is determined as follows:

$$\eta_A = 1 - \frac{P_{Loss.A}}{P_{left.A}} = 1 - \frac{k}{k+1} \frac{P_{Loss.total}}{P_{left.A}}$$

$$\eta_B = 1 - \frac{P_{Loss.B}}{\text{abs}(P_{right.B})} = 1 - \frac{k}{k+1} \frac{P_{Loss.total}}{\text{abs}(P_{right.B})}$$

The uncertainty of this method is very sensitive in respect of the so-called offset error. Since the values of torque or power in test B are mirrored at the zero level (sign change), it is important that this zero level is determined accurately. The drift or offset of the torque measurement can be determined compensated in different ways, for example with the following methods:

Zero compensation Method 1: The torque measurement is tested once prior to assembly (nulling) in order to determine, in order to define a measurement point for which the torque is zero.

Zero compensation Method 2: In idle mode, the drive train is slowly rotated once from one side in a first direction and then once in the opposite direction. The mean value of torque measurement values in the two tests is defined as the zero torque.

3. Variant III

This example describes the same method as variant II, but applied to an electric machine, for example the drive train of a wind turbine, as will be explained hereinafter with reference to FIGS. 12, 13 and 14. The powers $P_{right.A}$ and $P_{right.B}$ determined on the right side or also on the left side, for example by means of a current and voltage sensor 31 can be determined in the form of electrical powers, for example by current and voltage measurements, instead of or additionally to torque and speed measurements. The above-presented measurement method can thus either be checked, calibrated, replaced or supplemented. Due to the electrical measurements combined with the method according to the invention, the efficiency of the overall installation, inclusive of the generator and potentially also the rectifier, can also be measured. With this measurement method too, either the same or a different rotary direction, that is to say also a different or the same direction of the torques, can be selected for both tests.

4. Method for Torque Calibration

Methods for calibrating the torque measurement that are alternative or supplementary to patent DE 10 2018 203 525 can thus be found in conjunction with the method described here.

4.1 Extension I

In the case described here by way of example, the drive train in test B is not rotated in the opposite direction, and instead the rotary direction remains unchanged. The torque measurement can be calibrated. The example is shown in FIGS. 12, 13 and 14.

Figure 12:
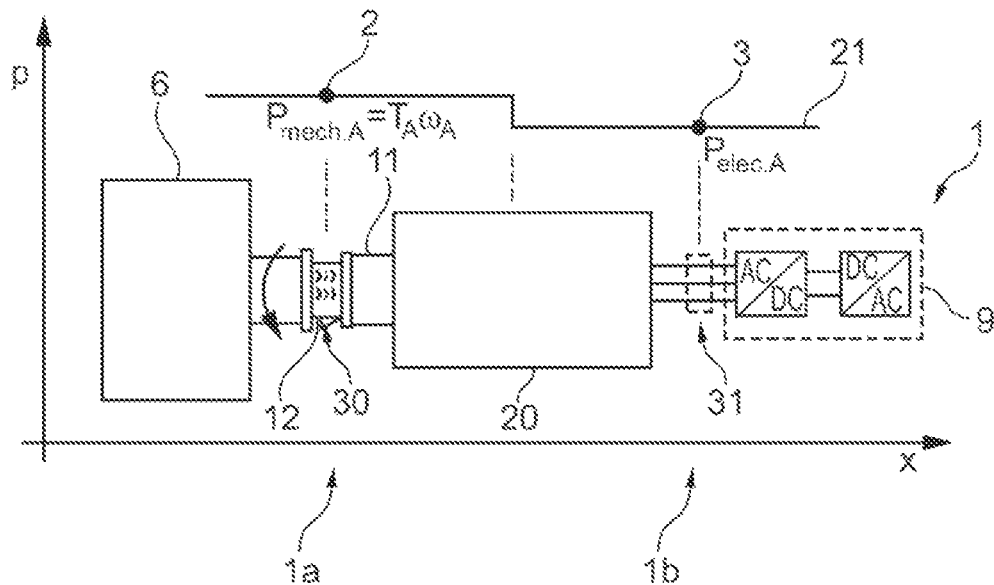
FIG. 12 shows in a further graph a test A. Normal operation of the wind turbine (WT) on the test bench driving said wind turbine.

FIGS. 12 shows, in the set-up of a first test, a part of a WT 20 with a generator on a test bench, the main shaft 11 of the WT being driven in the first test from the first end by means of a shaft adapter 12 by a motor 6. A rectifier 9 is electrically connected to the generator of the WT. The WT 20 can contain a gear unit and further components in addition to the generator. The level of the transmitted power is shown along the drive train by the curve 21.

The transmitted power or energy/the force flow is directed in FIG. 12 from left to right.

Figure 13:
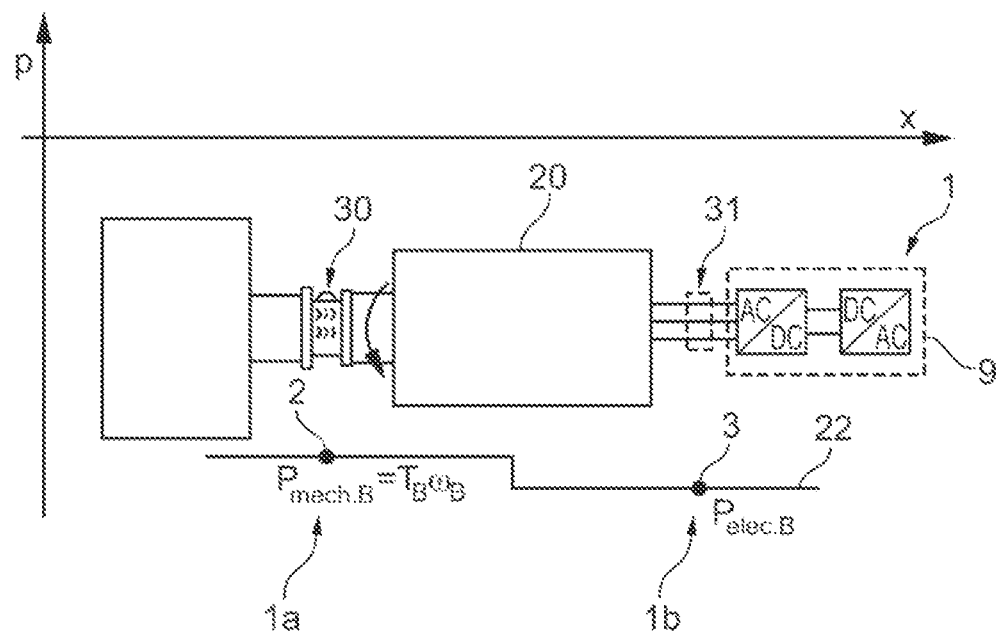
FIG. 13 shows in a further graph a test B. The generator of the WT runs as a motor and the motor of the test bench as a generator. The rotary direction remains unchanged as compared to test A (FIG. 12).

FIG. 13 shows the set-up for the second test/test B. The WT 20 is operated as a motor and the motor 6 of the test bench as a generator. The rotary direction remains unchanged as compared to test A/test 1. The energy flow or the force flow is directed from right to left. The curve 22 represents the level of the transmitted power/energy/the torque along the drive train.

Figure 14:
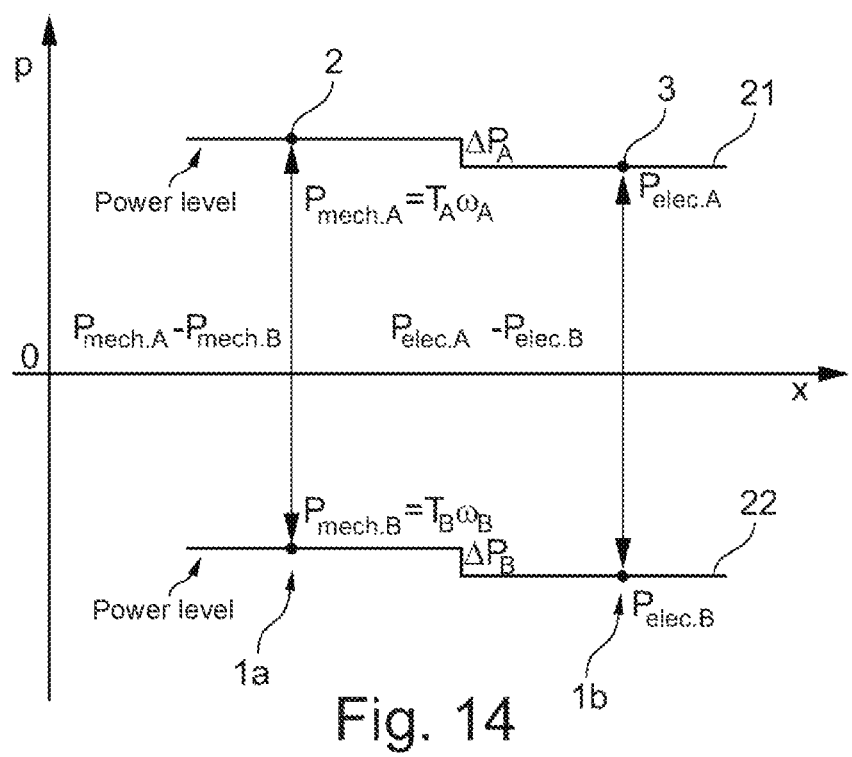
FIG. 14 shows here that the difference of the powers between the test A shown in FIG. 12 and the test B shown in FIG. 13 can be used as the basis for the torque calibration.

FIG. 14 shows, with the curves 21, 22 one above the other, the course of the powers/torques along the drive train for both tests. The difference of the powers between test A and test B can be used as the basis for the torque calibration. For the curve 22, a force flow passes from right to left, in the reverse direction for the curve 21.

The following is true:

$|\Delta P_A| = abs(P_{mech.A} - P_{elec.A})$ $|\Delta P_B| = abs(P_{elec.B} - P_{mech.B})$ $P_{mech.A} = P_{elec.A} + |\Delta P_A|$ $P_{mech.B} = P_{elec.B} + |\Delta P_B|$ $(P_{mech.A} - P_{mech.B}) = (P_{elec.A} - P_{elec.B}) + (|\Delta P_A| - |\Delta P_B|)$ The losses have compensated one another approximately in $(\Delta P_A - \Delta P_B)$, they therefore play only a subordinate role in the equation.

An equation between the side to be calibrated (mechanical measurement) and the reference measurement (electrical measurement) is thus created. A calibration is possible on the basis of the equation or a plurality of such equations from different working points, that is to say at different power and torque levels. In order to allow a complete calibration, an equation for zero torque is necessary.

Only with the equations of the delta power acquired at different working points can only the sensitivity be determined well, that is to say only the factor a, but not the factor b. In the equation $a(\varepsilon_A \omega_A - \varepsilon_B \omega_B) + b(\omega_A - \omega_B) = (P_{elec.A} - P_{elec.B}) + (|\Delta_A| - |\Delta P_B|)$, the factor b plays a very minimal role, since the absolute value of $(\omega_A - \omega_B)$ is virtually zero.

An exemplary possibility is presented below.

Assumption: Torque measurement is given here by the raw signal $\varepsilon$, which can be converted by means of a linear reference to the torque T.

$T = a \cdot \varepsilon + b$

Parameters a and b are to be determined in a calibration.

$$P_{mech.A} - P_{mech.B} = T_A \omega_A - T_B \omega_B$$
$$= (a\varepsilon_A + b)\omega_A - a\varepsilon_B + b)\omega_B$$
$$= a(\varepsilon_A \omega_A - \varepsilon_B \omega_B) + b(\omega_A - \omega_B)$$

In the following equation, all other parameters are known in addition to the parameters a and b to be determined. $(\Delta P_A - \Delta P_B)$ can either be left out or replaced with an assumed value.

$a(\varepsilon_A \omega_A - \varepsilon_B \omega_B) + b(\omega_A - \omega_B) = (P_{elec.A} - P_{elec.B}) + (|\Delta P_A| - |\Delta P_B|)$ The parameters a and b are determinable together with a further equation, for example of the zero torque state.

$$\begin{cases} a(\varepsilon_A \omega_A - \varepsilon_B \omega_B) + b(\omega_A - \omega_B) = (P_{elec.A} - P_{elec.B}) + (|\Delta P_A| - |\Delta P_B|) \\ a\varepsilon_0 + b = 0 \end{cases}$$

4.2 Extension II

In a further alternative method for calibrating the torque measurement, the calibration is based not on electrical power measurement, but exclusively on mechanical measurements.

Instead of electrical power, the calibration of the torque measurement on the slowly rotating shaft can also be realized indirectly with a torque sensor on the quickly rotating shaft on the other side of the gear unit.

The idea presented here is similar to "Extension I", with the difference that instead of the electrical power, a mechanical power is measured with the torque sensor and the rotary speed is detected. This will be explained with reference to FIGS. 15, 16 and 17. The torque measurements take place at the first end 1a and at the second end 1b of the drive train 1 between the two electric machines 6 and 7 of the test bench; on the profile curves 23 and 24 of the transmitted mechanical power P, the measurement points are denoted by 2 and 3, as in the other figures.

Figure 15:
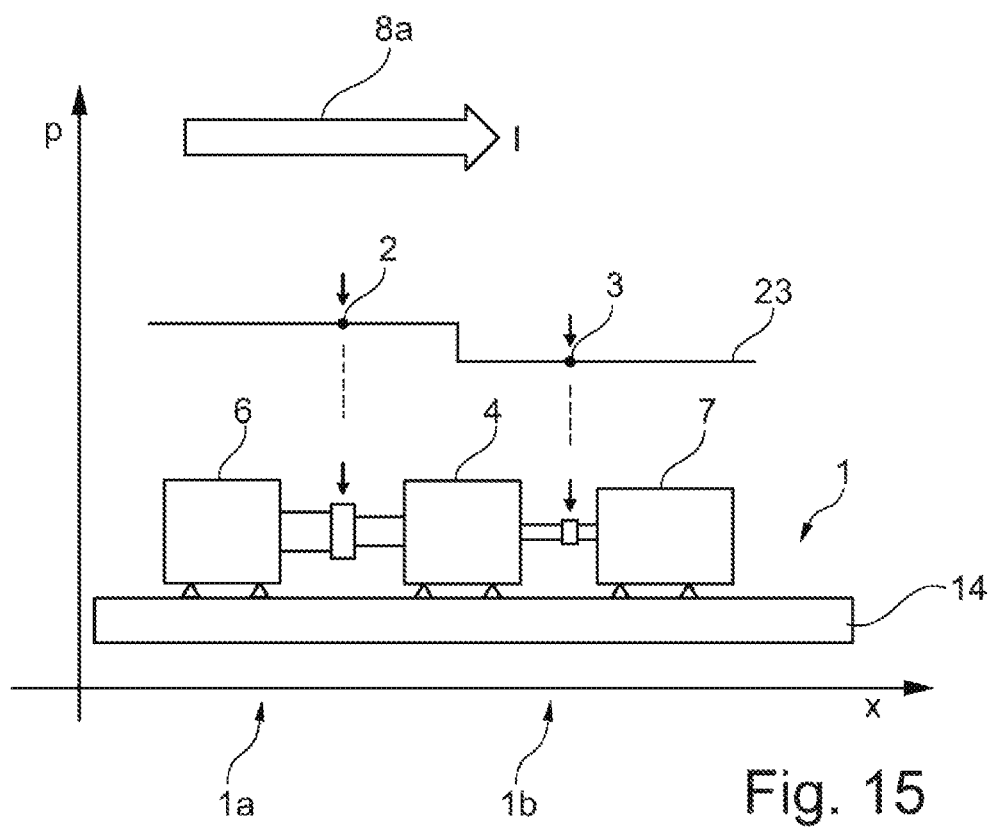
FIG. 15 shows in a further graph a first test A. Operation of a test bench with a gear unit.

FIG. 15 shows the set-up for the first test/test A. A gear unit 4 with shaft attachments is measured as test object on the test bench. The first machine/drive unit 6 is operated as a motor and the second machine/drive unit 7 as a load or generator.

Figure 16:
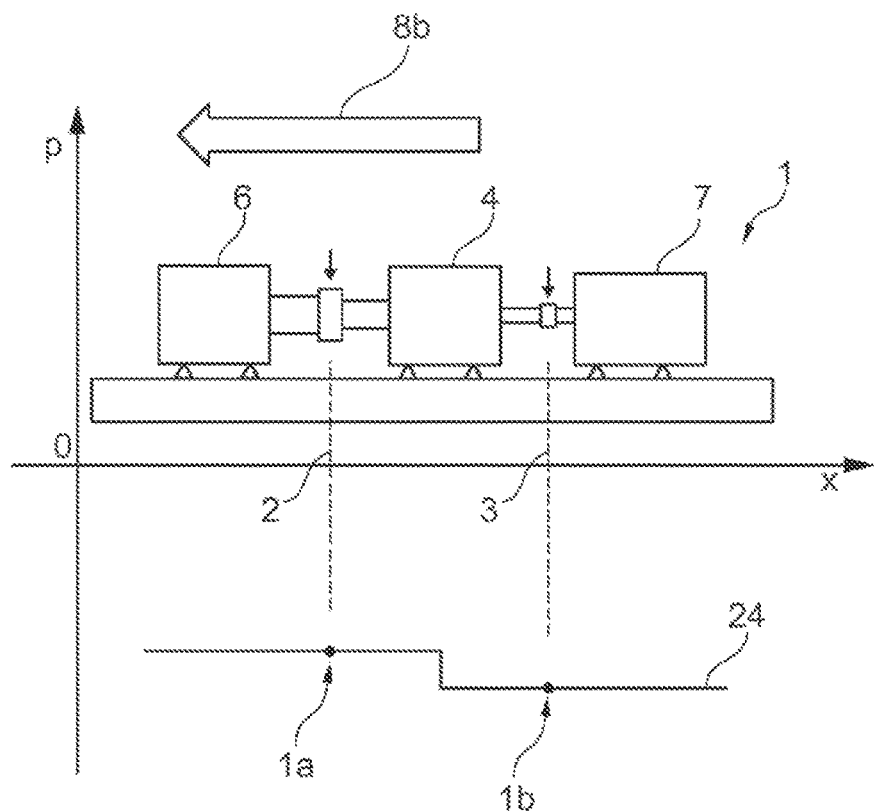
FIG. 16 shows a further graph of a second test B (cf.

FIG. 16 shows the set-up for the second test/test B. The machine 7 is operated as a driving motor and the machine 6 as a load/generator. The rotary direction remains unchanged in both tests.

Figure 17:
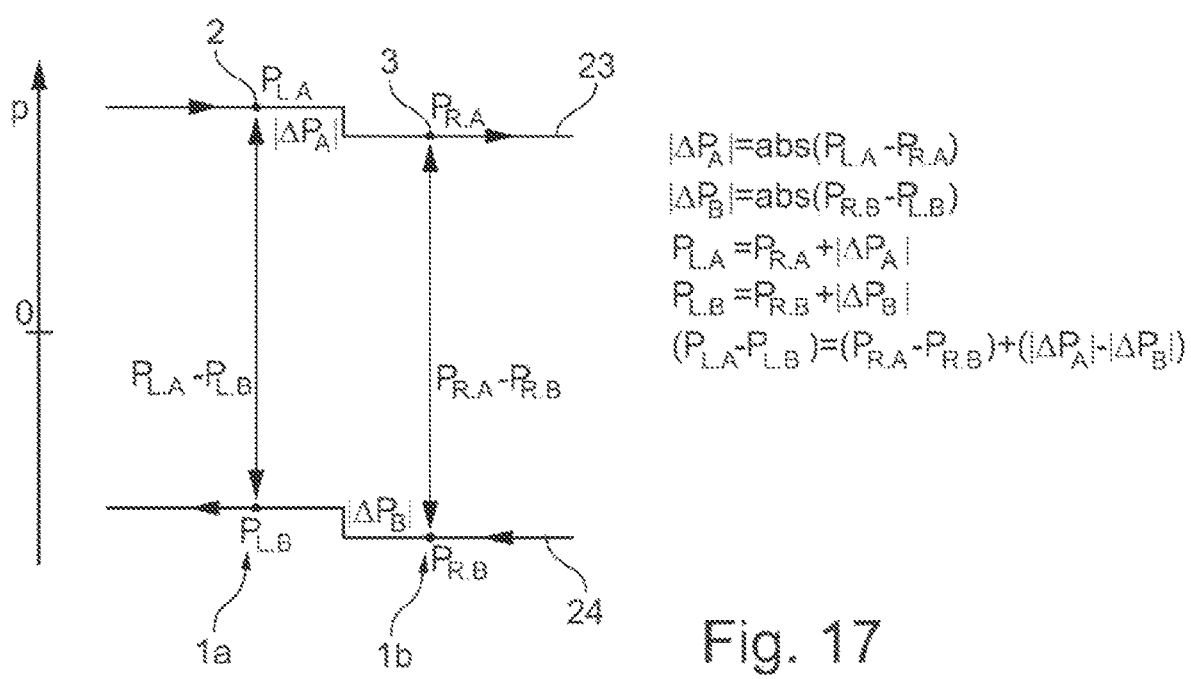
FIG. 17 shows here that the difference of the powers between test A and test B from FIGS. 15 and 16 can be used as the basis for the torque calibration.

FIG. 17 shows the two curves 23 and 24, which along the drive train represent the level of the transmitted power or of the transmitted torque. The difference of the powers transmitted at both ends between test A and test B can be used as the basis for the torque calibration.

In contrast to the situation according to FIG. 14, in this example the measured electrical powers are replaced by measured torques and rotary speeds. In other words, the torque measurement at the left/first or right/second end of the drive train to be measured can be calibrated in each case by means of the other. If, for example, the torque measurement on the right side is more precise than that on the left, for example due to the reduction by means of a gear unit, the measurement on the left can then be calibrated with the measurement on the right.

4.3 Extension III

The above-described test method can be used as a torque calibration, on the condition that, on the quickly rotating side of a gear unit with correspondingly low torques, which therefore can be detected with the necessary accuracy, a torque measurement is performed with sufficient accuracy, for example by means of a so-called torque transducer. In contrast to the situation according to DE102018203525, this more accurate mechanical power measurement is used instead of an electrical power measurement as the reference of the calibration.

Figure 18:
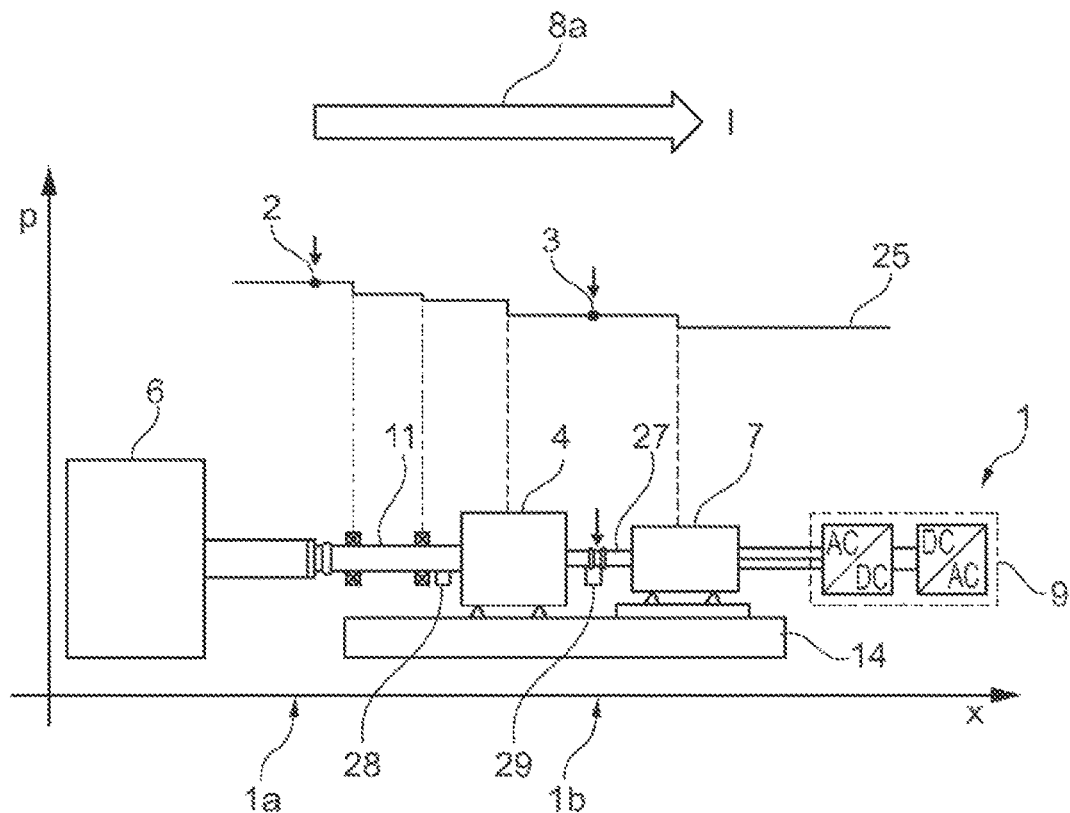
FIG. 18 shows a graph for a test A/test 1. Operation of the test bench with driving motor which drives the drive train of the WT. A precise torque sensor is installed between gear unit and generator.
Figure 19:
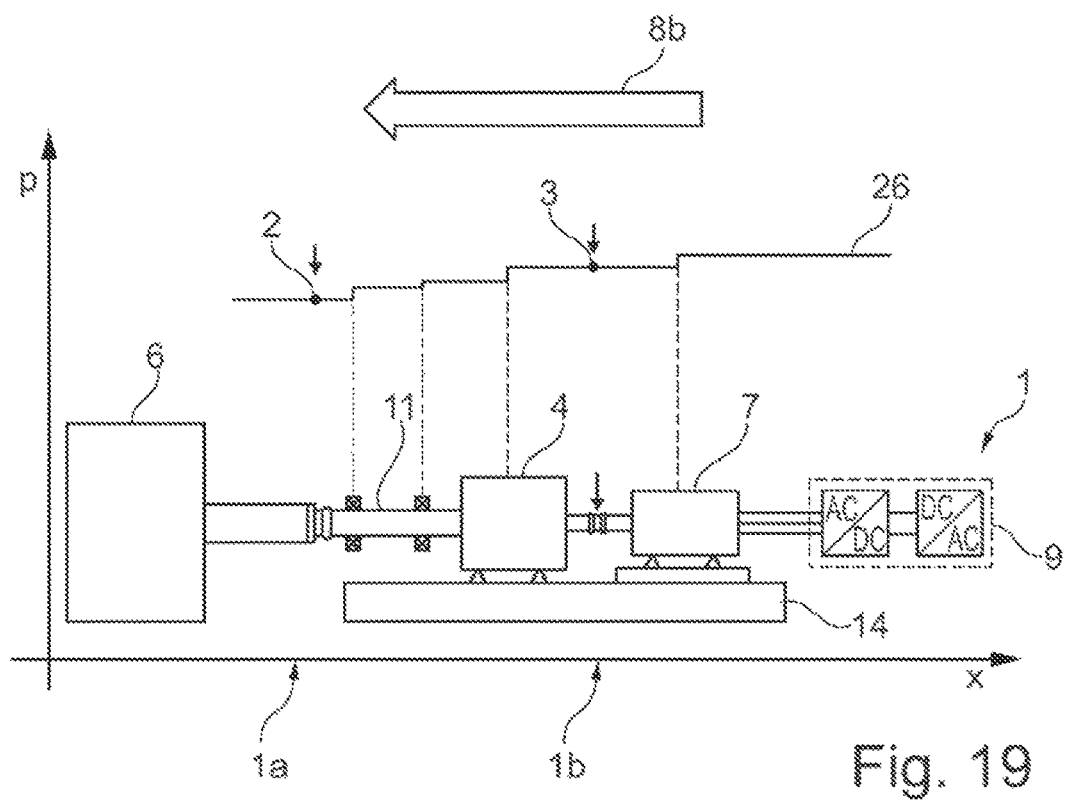
FIG. 19 shows a graph for a test B. In comparison with test A (FIG. 18), a reverse operation of the test bench and of the WT takes place. The rotary direction is likewise reversed.
Figure 20:
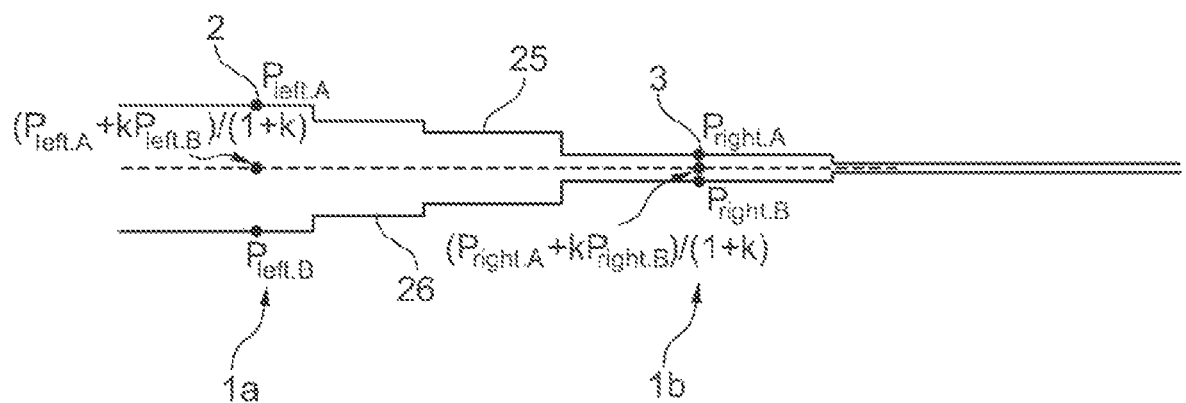
FIG. 20 shows a depiction of a graph of the powers from the two tests shown in FIGS. 18 and 19, measured at measurement points of the two ends of the drive train.

FIGS. 18 to 20 relate to the use of a precise torque sensor which is installed between the gear unit and the generator of a WT drive train.

FIG. 18 shows the set-up for the first test/test A. The motor 6 of the test bench drives the main shaft 11 of the WT. The gear unit 4 and the generator 7 is thus driven. A precise torque sensor is installed at the measurement point 3 between the gear unit and generator. At the higher rotary speed it measures the torque considerably more precisely than a torque sensor that is installed at the measurement point 2 between the motor 6 and the gear unit and measures there the torque at the lower rotary speed. The power/torque losses are shown by the curve 25.

FIG. 19 shows the set-up of the second test/test B with a reversed operation of the test bench and the WT, the generator 7 of the WT driving the motor 6 of the test bench. The directions of the energy flows/the torque transmission are shown by the arrows 8*a* and 8*b*; the power/torque losses are indicated by the curve 26. The rotary direction is reversed in the second test as compared to the first test.

For the power losses of the drive train between the two torque measurements, the following is true:

$$P_{Loss.A} = P_{left.A} - P_{right.A} \quad P_{Loss.B} = P_{right.B} - P_{left.B}$$

Assumption:

$$P_{Loss.A} = k \cdot P_{Loss.B}$$

$$P_{left.A} - P_{right.A} = k(P_{right.B} - P_{left.B})$$

$$P_{left.A} + kP_{left.B} = P_{right.A} + kP_{right.B}$$

If test A and test B are repeated at other working points, further equations can be established and the equation system can be solved at least approximately. A calibration is possible in this way.

The invention claimed is:

1. A method for ascertaining an efficiency of a drive train, the drive train including:
    a first end with a first shaft portion, the first shaft portion configured to be driven by a first drive device;
    a second end with a second shaft portion, the second shaft portion configured to be driven by a second drive device; and
    a mechanical transfer element located between the first end and the second end, the method comprising:
    driving the first end of the drive train in a first test;
    detecting a variable dependent on a torque acting on the first shaft portion at the first end of the drive train and a variable dependent on a torque acting on the second shaft portion at the second end of the drive train during the first test;
    driving the second end of the drive train in a second test;
    detecting a variable dependent on a torque acting on the second shaft portion at the second end of the drive train and a variable dependent on a torque acting on the first shaft portion on the first end of the drive train during the second test; and
    determining an efficiency of the drive train, wherein the efficiency is determined based on one or more of: a power determined during the first test, a power determined during the second test, the variable dependent on the torque acting on the first shaft portion and the variable depending on the torque on the second shaft portion during the first test, the variable dependent on the torque acting on the first shaft portion and the variable depending on the second shaft portion during the second test, and at least one predetermined criterion, wherein the variable dependent on the torque acting on the first shaft portion during the first test and the variable dependent on the torque acting on the second shaft portion during the second test are each measured by a sensor detecting a mechanical measurement variable.

2. The method of claim 1, further comprising:
    determining a first calibration parameter a, and a second calibration parameter b being from the powers determined in the first test and in the second test based on a rotary speed in the first test and a rotary speed in the second test, wherein, the first test and the second test are performed for at least two different torque stages, and wherein one of the at least two different torque stages is a zero torque stage.

3. The method according to claim 1, wherein the at least one predetermined criterion is that the efficiency of the first test is equal to the efficiency of the second test.

4. The method according to claim 1, wherein the at least one predetermined criterion is that a power loss of one of the first test or the second test is a specific fraction of an overall power loss of the first test and the second test.

5. The method according to claim 1, further comprising:
    determining, for the first test and the second test, the torque acting on the first shaft portion and the torque acting on the second shaft portion, wherein the variable dependent on the torque acting on the first shaft portion and the variable dependent on the torque acting on the second shaft portion in the first test and the second test is measured using a strain gauge, and/or wherein an angular position or a rotational speed of the first shaft portion and the second shaft portion in the first test and the second test is measured using an incremental encoder.

6. The method according to claim 1 wherein a mechanical power for the first test and a mechanical power for the second test is ascertained, respectively, from the variables dependent on the torques acting on the first shaft portion and the second shaft portion.

7. The method according to claim 1, wherein in the first and/or second test on a drive side and/or an output side, an electrical power of the drive train operated as a motor or generator is measured in addition to or exclusively as a variable dependent on the torque acting on the first shaft portion and the second shaft portion, and wherein at least one voltage and at least one current are measured to determine the electrical power at the drive side and/or the output side.

8. The method according to claim 1, wherein for the first test a first test power loss is determined and for the second test a second test power loss is determined, wherein the first test power loss and the second test power loss are added to give an overall power loss, and wherein the efficiency is determined based on the overall power loss.

9. The method according to claim 1, wherein to determine the variable dependent on the torque acting on the first shaft portion or the variable dependent on the torque acting on the second shaft portion, a measurement signal of a sensor is evaluated, wherein the sensor is located on at least one of the first shaft portion, the second shaft portion, or on a shaft adapter located adjacent to at least one of the first shaft portion or the second shaft portion.

10. The method according to claim 1, wherein during the first test and the second test the drive train is operated at one or more different working points, wherein the operated working points are the same during the first test and the second test.

11. The method according to claim 1, wherein in the second test the second end of the drive train is driven in such a way that the variable dependent on the torque acting on the first shaft portion in the second test is the same as the variable dependent on the torque acting on the first shaft portion determined in the first test.

12. The method according to claim 1, wherein in the second test the second end of the drive train is driven in such a way that the variable dependent on the torque acting on the second shaft portion in the second test is the same as the variable dependent on the torque acting on the second shaft portion determined in the first test.

13. The method according to claim 1, wherein a rotary direction of the first shaft portion and the second shaft portion during the first test and the second test is the same.

14. The method according to claim 1, wherein a first mechanical power PmechA and a second mechanical power PmechB are determined using the variable dependent on the torque acting on the first shaft portion and depending on two constants a and b for the first test and for the second test and based on:

$$P_{mech.leftA} - P_{mech.rightA} = k(P_{mech.rightB} - P_{mech.leftB})$$
and $P_{mech.leftA} + kP_{mech.rightB} + P_{mech.rightA}$, wherein k is a ratio between losses (in the form of a transmitted energy as integral) of the first test, $P^{int}_{mechB}$=integral($a*\varepsilon+b$)$d\Theta/t_A$, and of the second test $P^{int}_{mechB}$=integral($a*\varepsilon+b$)$d\Theta/t_B$, wherein the constants a and b are calibration parameters, and wherein the calibration parameters a and b are used to determine a torque $T=a*\varepsilon+b$, wherein T is the torque and $\varepsilon$ is the variable dependent on the torque acting on the first shaft portion.

15. The method of claim 1 wherein the drive train is a drive train of a wind turbine.

16. The method of claim 1, wherein the mechanical transfer element is a gear unit.

17. A device for ascertaining an efficiency of a drive train, comprising:
a first drive device for driving a first end of the drive train during a first test;
a second drive device for driving a second end of the drive train during a second test;
a first measuring device for detecting at the first end of the drive train a variable dependent on a torque acting on a first shaft portion of the first end of the drive train during the first test;
a second measuring device for detecting at the second end of the drive train a variable dependent on a torque acting on a second shaft portion at the second end of the drive train during the second test; and
at least one third measuring device for detecting at least one of a rotary speed or a rotary angle of the drive train wherein the first measuring device and the second measuring device each comprise a sensor detecting a mechanical measurement variable; and
a controller, communicatively coupled to the first measuring device, the second measuring device, and the third measuring device, the controller configured to determine an efficiency of the drive train based on one or more of: a power determined during the first test, a power determined during the second test, the variable dependent on the torque acting on the first shaft portion and the variable depending on the torque on the second shaft portion during the first test, the variable dependent on the torque acting on the first shaft portion and the variable depending on the second shaft portion during the second test, and at least one predetermined criterion, wherein the variable dependent on the torque acting on the first shaft portion during the first test and the variable dependent on the torque acting on the second shaft portion during the second test are each measured by a sensor detecting a mechanical measurement variable.

18. The device of claim 17, wherein the drive train is a part of a drive train of a wind turbine.

19. A device for ascertaining an efficiency of a drive train of a wind turbine, comprising:
a first drive device configurable for driving a first end of the drive train during a first test;
a second drive device configurable for driving a second end of the drive train during a second test;
a first measuring device configurable for detecting at the first end of the drive train a variable dependent on a torque acting on a first shaft portion of the first end of the drive train;
a second measuring device configurable for detecting at the second end of the drive train a variable dependent on a torque acting on a second shaft portion at the second end of the drive train;
at least one third measuring device configurable for detecting at least one of a rotary speed or a rotary angle of the drive train, wherein at least one of the first drive device or the second drive device includes a gear unit, wherein at least one of the first measuring device or the second measuring device includes a strain gauge, and wherein the at least one third measuring device includes an incremental encoder, and wherein the first measuring device and the second measuring device each comprise a sensor detecting a mechanical measurement variable; and
a controller, communicatively coupled to the first measuring device, the second measuring device, and the third measuring device, the controller configured to determine an efficiency of the drive train based on one or more of: a power determined during the first test, a power determined during the second test, the variable dependent on the torque acting on the first shaft portion and the variable depending on the torque on the second shaft portion during the first test, the variable dependent on the torque acting on the first shaft portion and the variable depending on the second shaft portion during the second test, and at least one predetermined criterion, wherein the variable dependent on the torque acting on the first shaft portion during the first test and the variable dependent on the torque acting on the second shaft portion during the second test are each measured by a sensor detecting a mechanical measurement variable.

20. A method for ascertaining an efficiency of a drive train, the drive train including:
a first end with a first shaft portion, the first shaft portion configured to be driven by a first drive device;
a second end with a second shaft portion, the second shaft portion configured to be driven by a second drive device; and
a mechanical transfer element located between the first end and the second end, the method comprising:
driving the first end of the drive train in a first test;
detecting a variable dependent on a torque acting on the first shaft portion at the first end of the drive train and a variable dependent on a torque acting on the second shaft portion at the second end of the drive train during the first test;
driving the second end of the drive train in a second test;
detecting a variable dependent on a torque acting on the second shaft portion at the second end of the drive train and a variable dependent on a torque acting on the first shaft portion on the first end of the drive train during the second test;
determining an efficiency of the drive train, wherein the efficiency is determined based on one or more of: a power determined during the first test, a power determined during the second test, the variable dependent on the torque acting on the first shaft portion and the variable depending on the torque on the second shaft portion during the first test, the variable dependent on the torque acting on the first shaft portion and the variable depending on the second shaft portion during the second test, and at least one predetermined criterion; and
determining a first calibration parameter a, and a second calibration parameter b being from the powers determined in the first test and in the second test based on a rotary speed in the first test and a rotary speed in the second test, wherein, the first test and the second test are performed for at least two different torque stages, and wherein one of the at least two different torque stages is a zero torque stage.

21. A method for ascertaining an efficiency of a drive train, the drive train including:
a first end with a first shaft portion, the first shaft portion configured to be driven by a first drive device;
a second end with a second shaft portion, the second shaft portion configured to be driven by a second drive device; and
a mechanical transfer element located between the first end and the second end, the method comprising:
driving the first end of the drive train in a first test;
detecting a variable dependent on a torque acting on the first shaft portion at the first end of the drive train and a variable dependent on a torque acting on the second shaft portion at the second end of the drive train during the first test;
driving the second end of the drive train in a second test;
detecting a variable dependent on a torque acting on the second shaft portion at the second end of the drive train and a variable dependent on a torque acting on the first shaft portion on the first end of the drive train during the second test; and
determining an efficiency of the drive train, wherein the efficiency is determined based on one or more of: a power determined during the first test, a power determined during the second test, the variable dependent on the torque acting on the first shaft portion and the variable depending on the torque on the second shaft portion during the first test, the variable dependent on the torque acting on the first shaft portion and the variable depending on the second shaft portion during the second test, and at least one predetermined criterion, wherein for the first test a first test power loss is determined and for the second test a second test power loss is determined, wherein the first test power loss and the second test power loss are added to give an overall power loss, and wherein the efficiency is determined based on the overall power loss.

22. A method for ascertaining an efficiency of a drive train, the drive train including:
a first end with a first shaft portion, the first shaft portion configured to be driven by a first drive device;
a second end with a second shaft portion, the second shaft portion configured to be driven by a second drive device; and
a mechanical transfer element located between the first end and the second end, the method comprising:
driving the first end of the drive train in a first test;
detecting a variable dependent on a torque acting on the first shaft portion at the first end of the drive train and a variable dependent on a torque acting on the second shaft portion at the second end of the drive train during the first test;
driving the second end of the drive train in a second test;
detecting a variable dependent on a torque acting on the second shaft portion at the second end of the drive train and a variable dependent on a torque acting on the first shaft portion on the first end of the drive train during the second test; and
determining an efficiency of the drive train, wherein the efficiency is determined based on one or more of: a power determined during the first test, a power determined during the second test, the variable dependent on the torque acting on the first shaft portion and the variable depending on the torque on the second shaft portion during the first test, the variable dependent on the torque acting on the first shaft portion and the variable depending on the second shaft portion during the second test, and at least one predetermined criterion, and wherein a rotary direction of the first shaft portion and the second shaft portion during the first test and the second test is the same.

23. A method for ascertaining an efficiency of a drive train, the drive train including:
a first end with a first shaft portion, the first shaft portion configured to be driven by a first drive device;
a second end with a second shaft portion, the second shaft portion configured to be driven by a second drive device; and
a mechanical transfer element located between the first end and the second end, the method comprising:
driving the first end of the drive train in a first test;
detecting a variable dependent on a torque acting on the first shaft portion at the first end of the drive train and a variable dependent on a torque acting on the second shaft portion at the second end of the drive train during the first test;
driving the second end of the drive train in a second test;
detecting a variable dependent on a torque acting on the second shaft portion at the second end of the drive train and a variable dependent on a torque acting on the first shaft portion on the first end of the drive train during the second test; and determining an efficiency of the drive train, wherein the efficiency is determined based on one or more of: a power determined during the first test, a power determined during the second test, the variable dependent on the torque acting on the first shaft portion and the variable depending on the torque on the second shaft portion during the first test, the variable dependent on the torque acting on the first shaft portion and the variable depending on the second shaft portion during the second test, and at least one predetermined criterion, wherein a first mechanical power PmechA and a second mechanical power PmechB are determined using the variable dependent on the torque acting on the first shaft portion and depending on two constants a and b for the first test and for the second test and based on: Pmech.leftA−Pmech.rightA=k(Pmech.right.B−Pmech.left.B) and Pmech.left.A+kPmech.right.B+Pmech.right.A, wherein k is a ratio between losses (in the form of a transmitted energy as integral) of the first test, PintmechB=integral $(a*\varepsilon+b)d\Theta/tA$, and of the second test PintmechB=integral$(a*\varepsilon+b)d\Theta/tB$, wherein the constants a and b are calibration parameters, and wherein the calibration parameters a and b are used to determine a torque $T=a*\varepsilon+b$, and wherein T is the torque and $\varepsilon$ is the variable dependent on the torque acting on the first shaft portion.

\* \* \* \* \*